United States Patent
Deshmukh et al.

(10) Patent No.: US 10,803,254 B2
(45) Date of Patent: *Oct. 13, 2020

(54) SYSTEMATIC TUNING OF TEXT ANALYTIC ANNOTATORS

(71) Applicant: International Business Machines Corporation, Armonk, NY (US)

(72) Inventors: Harish Deshmukh, Mountain View, CA (US); Philip E. Parker, York, SC (US); Roger C. Raphael, San Jose, CA (US); Paul S. Taylor, Redwood City, CA (US); Gabriel Valencia, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 270 days.

This patent is subject to a terminal disclaimer.

(21) Appl. No.: 16/034,474

(22) Filed: Jul. 13, 2018

(65) Prior Publication Data
US 2018/0322113 A1 Nov. 8, 2018

Related U.S. Application Data

(63) Continuation of application No. 14/459,519, filed on Aug. 14, 2014, now Pat. No. 10,275,458.

(51) Int. Cl.
*H03M 7/30* (2006.01)
*H04B 1/66* (2006.01)
(Continued)

(52) U.S. Cl.
CPC ............. *G06F 40/35* (2020.01); *G06F 16/20* (2019.01); *G06F 40/169* (2020.01);
(Continued)

(58) Field of Classification Search
CPC .......... G06F 40/35; G06F 16/20; G06F 40/40; G06F 40/169; G06F 40/284; G06F 16/35;
(Continued)

(56) References Cited

U.S. PATENT DOCUMENTS 6,714,939 B2  3/2004  Saldanha
7,941,438 B2  5/2011  Molina-Moreno
(Continued)

OTHER PUBLICATIONS

List of IBM Patents or Patent Applications Treated as Related, Jul. 2018, 1 page.

*Primary Examiner* — Cesar B Paula
*Assistant Examiner* — Luu-Phuong T Nguyen
(74) *Attorney, Agent, or Firm* — Joseph Polimeni; Edell, Shapiro & Finnan, LLC

(57) ABSTRACT

A data structure is generated containing enumerators for data types of a domain, text forms of the enumerators and context patterns for the text forms. The data structure also includes information extraction rules that are associated with the enumerators. The data structure is updated with additional context patterns and text forms that are identified within a set of documents to which text analytic annotators are to be tuned. The set of documents are analyzed against the updated data structure and additional extraction rules are generated based on the analysis.

18 Claims, 7 Drawing Sheets

(51) Int. Cl.
*G06F 40/35* (2020.01)
*G06F 16/20* (2019.01)
*G06F 40/40* (2020.01)
*G06F 40/169* (2020.01)
*G06F 40/284* (2020.01)
*G06K 9/00* (2006.01)
*G06F 16/35* (2019.01)
*G06F 16/38* (2019.01)
*G06F 16/81* (2019.01)
*G06F 16/28* (2019.01)
*G06F 16/335* (2019.01)
*G06F 16/951* (2019.01)
*G06F 16/9535* (2019.01)
*G06F 40/103* (2020.01)
*G06F 40/166* (2020.01)

(52) U.S. Cl.
CPC ............ *G06F 40/284* (2020.01); *G06F 40/40* (2020.01); *G06K 9/00456* (2013.01); *G06F 16/285* (2019.01); *G06F 16/335* (2019.01); *G06F 16/35* (2019.01); *G06F 16/38* (2019.01); *G06F 16/81* (2019.01); *G06F 16/951* (2019.01); *G06F 16/9535* (2019.01); *G06F 40/103* (2020.01); *G06F 40/166* (2020.01)

(58) Field of Classification Search
CPC ........ G06F 16/38; G06F 16/81; G06F 16/285; G06F 16/335; G06F 16/951; G06F 16/9535; G06F 40/103; G06F 40/166; G06K 9/00456; H03M 7/30; H04B 1/66; H04L 67/38
USPC ......................................................... 715/229
See application file for complete search history.

(56) References Cited

U.S. PATENT DOCUMENTS

| | | |
|---|---|---|
| 8,112,451 B1 | 2/2012 | Graham |
| 8,489,530 B2 | 7/2013 | De et al. |
| 8,630,989 B2 | 1/2014 | Blohm et al. |
| 8,762,362 B1 | 6/2014 | Sathe |
| 2001/0018696 A1* | 8/2001 | Hori ..................... G06F 40/166 715/229 |
| 2002/0062475 A1 | 5/2002 | Iborra |
| 2003/0069908 A1 | 4/2003 | Anthony |
| 2003/0131073 A1 | 7/2003 | Lucovsky |
| 2003/0167266 A1 | 9/2003 | Saldanha |
| 2003/0208498 A1 | 11/2003 | Feinberg |
| 2004/0006742 A1 | 1/2004 | Slocombe |
| 2004/0205454 A1 | 10/2004 | Gansky |
| 2004/0205615 A1 | 10/2004 | Birder |
| 2005/0050056 A1 | 3/2005 | Idicula |
| 2005/0060647 A1 | 3/2005 | Doan |
| 2005/0065953 A1 | 3/2005 | Bower |
| 2005/0138648 A1 | 6/2005 | Ahmed |
| 2005/0182736 A1 | 8/2005 | Castellanos |
| 2006/0195454 A1 | 8/2006 | Davis |
| 2006/0248076 A1 | 11/2006 | Troy et al. |
| 2007/0078889 A1 | 4/2007 | Hoskinson |
| 2007/0112714 A1 | 5/2007 | Fairweather |
| 2007/0233755 A1* | 10/2007 | Ohdake ................ G06F 16/248 |
| 2008/0082560 A1 | 4/2008 | Agrawal |
| 2009/0125542 A1 | 5/2009 | Loeser et al. |
| 2009/0226872 A1 | 9/2009 | Gunther |
| 2010/0169299 A1 | 7/2010 | Pollara |
| 2010/0169311 A1 | 7/2010 | Tengli |
| 2010/0293451 A1 | 11/2010 | Carus |
| 2011/0295854 A1 | 12/2011 | Chiticariu |
| 2014/0012866 A1 | 1/2014 | Bowman |
| 2015/0106078 A1 | 4/2015 | Chang |
| 2016/0048499 A1 | 2/2016 | Deshmukh et al. |
| 2016/0048501 A1 | 2/2016 | Deshmukh et al. |

\* cited by examiner

SYSTEMATIC TUNING OF TEXT ANALYTIC ANNOTATORS

CROSS-REFERENCE TO RELATED APPLICATIONS

This application is a continuation of U.S. patent application Ser. No. 14/459,519, entitled "SYSTEMATIC TUNING OF TEXT ANALYTIC ANNOTATORS WITH SPECIALIZED INFORMATION" and filed Aug. 14, 2014, the disclosure of which is incorporated herein by reference in its entirety.

BACKGROUND

1. Technical Field

The present inventive concept relates generally to computational linguistics and embodiments thereof more specifically relate to information extraction of documents.

2. Discussion of the Related Art

Information extraction (IE) is a process or set of processes by which structured information is extracted from structured or semi-structured machine-readable documents. Modern IE systems and tools typically employ elements of natural language processing (NLP) to, in the case of text data, identify linguistic elements in a collection of documents, analyze the identified elements against a set of rules and extract meaningful information from the analysis results. The extracted information is used in, for example, database/knowledgebase querying, language translation, business analytics, and numerous other applications. Construction of such an NLP mechanism typically involves lengthy development times as well as the services, and corresponding costs, of human NLP experts.

Many IE tools such as text analytic annotators are universal or generic and can be used across domains of discourse where little more than common, everyday language is expected. However, in domains where the grammar and/or vocabulary becomes more specialized, such as in the fields of healthcare, law, finance, scientific research and others, constructing reusable or universally applicable annotators becomes more challenging. The context in which field-specific terminology is used, the manner in which organizationally-internal nomenclature extends and/or deviates from standard terminology, the structuring of text in different documents, etc. can vary substantially across organizations operating within the same domain. Typically, these issues have been addressed by the aforementioned NLP experts through a process of studying a sample set of documents, constructing abstractions based on the study by which field- and organization-specific terminology usage can be resolved and then manually generating and/or tuning processor code from which processor-executable text analytic annotators are produced. Not only does this process require expert personnel, it is labor intensive and results in annotators that have only limited use, if any, outside of the organization for which they were tuned.

SUMMARY

The present inventive concept is embodied to systematically tune text analytic annotators. A data structure is generated that includes one or more enumerators for one or more enumerated data types of a domain of discourse, one or more text forms of the enumerators, and one or more context patterns for the text forms. The data structure also includes one or more information extraction rules associated with the enumerators. The data structure is updated with one or more additional context patterns and text forms for the enumerators in the data structure that are identified within a set of documents for which the extraction rules are to be tuned. The set of documents are analyzed against the updated data structure and, based on the analysis, one or more additional extraction rules are generated.

BRIEF DESCRIPTION OF THE SEVERAL VIEWS OF THE DRAWINGS

Embodiments of the present general inventive concept are described with reference to the drawings containing the figures briefly described below. Generally, like reference numerals in the various figures are intended to refer to like features.

DETAILED DESCRIPTION

Figure 1:
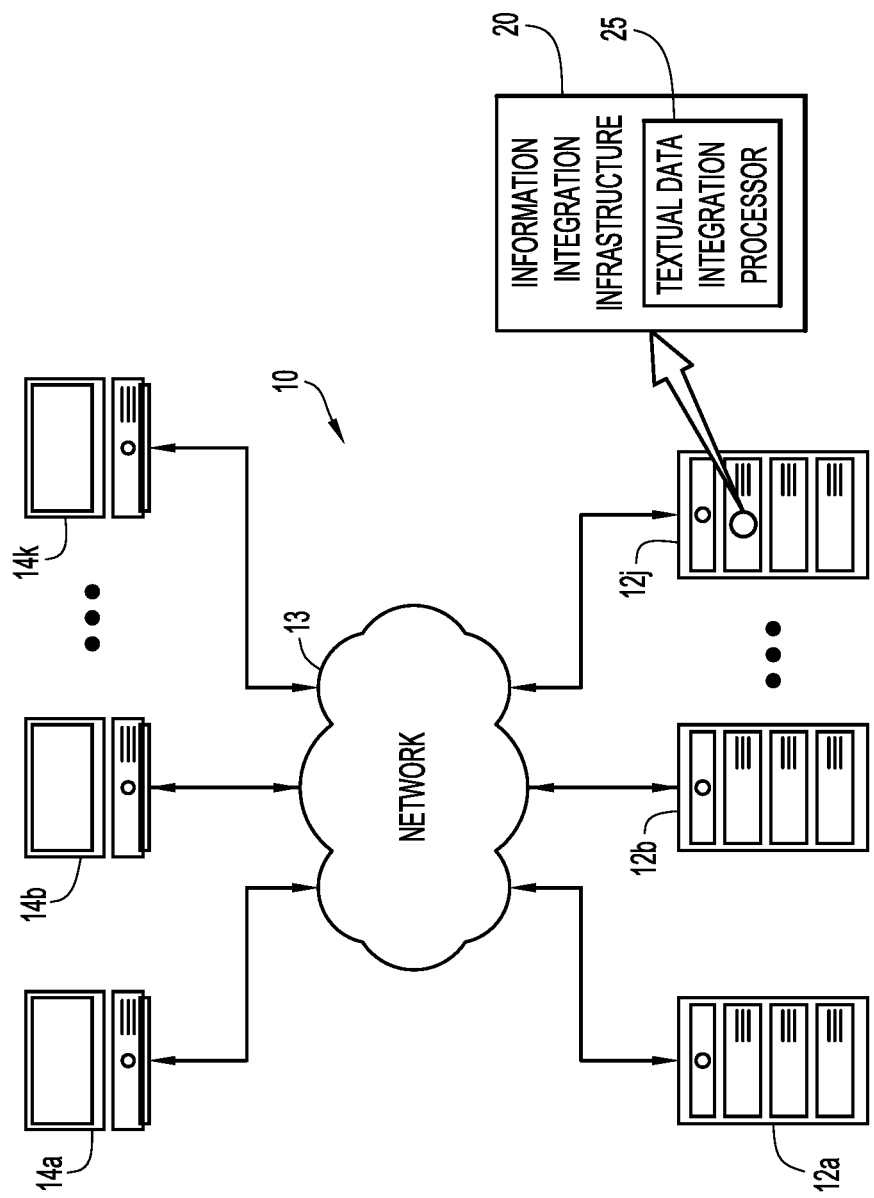
FIG. 1 is a schematic block diagram of a system in which the present general inventive concept can be embodied.

An example environment for use with present invention embodiments is illustrated in FIG. 1 as enterprise infrastructure 10. As is illustrated, the environment includes one or more server systems 12a-12j, representatively referred to herein as server system(s) 12, and one or more client or end-user systems 14a-14k, representatively referred to herein as client system(s) 14. Server systems 12 and client systems 14 may be remote from each other and may communicate over a network 13. Network 13 may be implemented through any number of suitable communications media, e.g., metallic conductors, optical fiber, air, etc. using one or more signaling techniques and possibly in accordance with one or more standardized communication protocols, e.g., Internet Protocol (IP), Transport Control Protocol (TCP), User Datagram Protocol (UDP), etc. Network 13 may be supported by suitable hardware components to implement wide area networks (WAN), local area networks (LAN), internets, intranets, etc. Alternatively, server systems 12 and client systems 14 may be sufficiently local to each other to communicate with each other through direct or line-of-sight techniques, e.g., wireless radio links, fiber-less optical links, etc. In certain implementations, services and functionality of server systems 12 and those of client systems 14 may be performed by common circuitry and shared computational resources in a device such as a workstation.

Server systems 12 and client systems 14 may be implemented by any conventional or other computer systems preferably equipped with a display or monitor, a base (e.g., including at least one processor (not illustrated), one or more memories (not illustrated) and/or internal or external network interfaces or communications devices, e.g., modem, network cards, etc. (not illustrated), optional input devices, e.g., a keyboard, mouse or other input device (not illustrated), and any commercially available, open-source and custom software, e.g., operating system, server/communications software, browser/interface software, etc.

One or more processors and one or more storage devices of server systems 12 may be configured or otherwise constructed to implement an information integration infrastructure (III) 20 by which enterprise information from heterogeneous data sources utilizing differing conceptual, contextual and typographical representations is collected, stored and managed in a unified data framework. Such information may be extracted through analysis of the unstructured or semi-structured data collected from the aforementioned data sources against an established information model, from which informative data (e.g., metadata) may be generated that are mapped to or otherwise consistent with the information model and storing the informative data in one or more databases. To extract information from textual data, information integration infrastructure 20 may implement a textual data integration processor 25.

Figure 2:
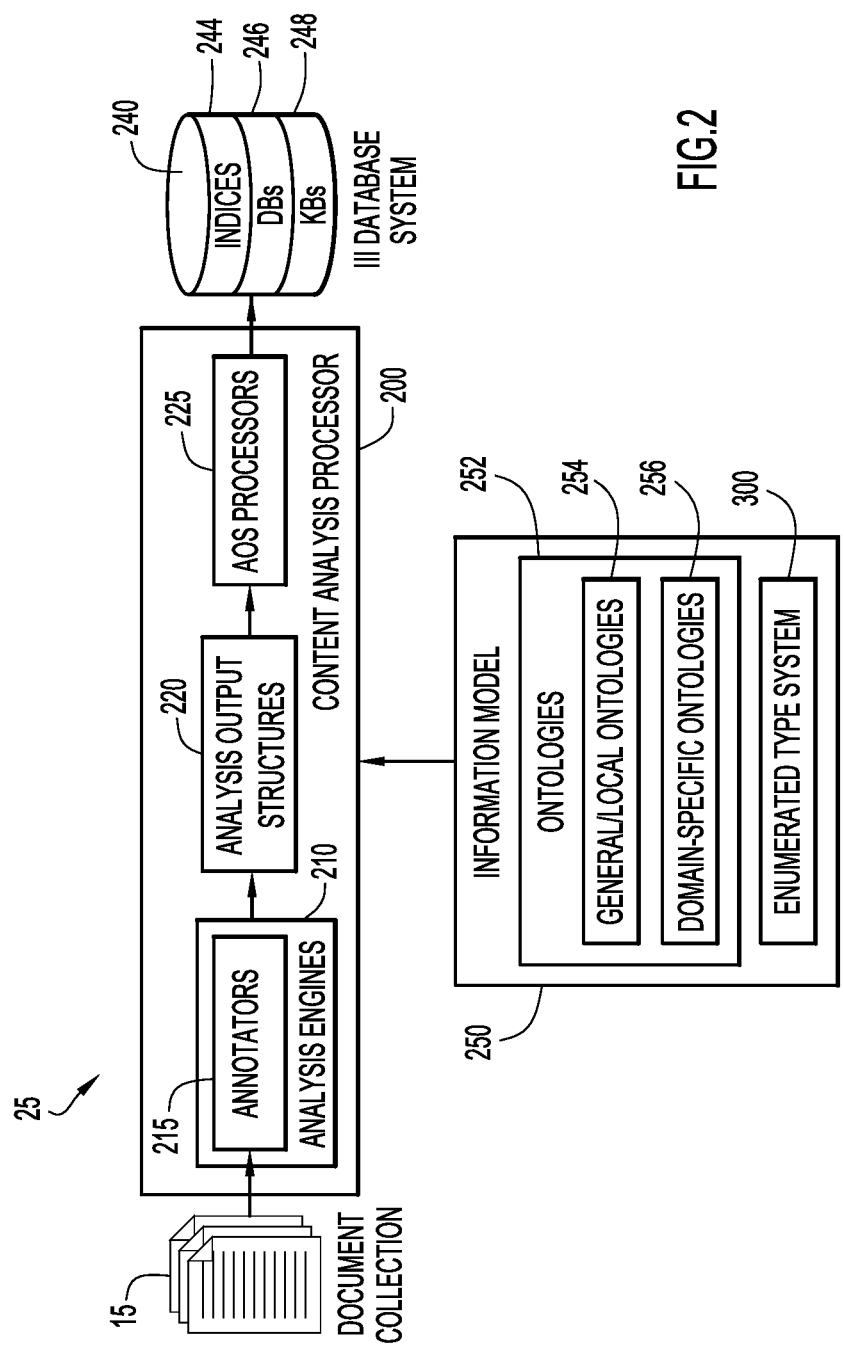
FIG. 2 is a schematic block diagram of a textual data integration processor in which the present general inventive concept can be embodied.

FIG. 2 is a schematic block diagram of certain example components of a textual data integration processor 25. Textual data integration processor 25 may be constructed or otherwise configured in accordance with an established information model 250, which, as used herein, represents the linguistic concepts of for each domain of discourse realized in III 20, and the relationships between those concepts, constraints, rules, and operations by which textual content, generically referred to herein as text document(s), is construed to derive its underlying semantics. Accordingly, information model 250 may encompass multiple ontologies 252. As used herein, an "ontology" is a specification of linguistic entities by which meaning is conveyed between agents in a domain of discourse including, but not limited to, the lexicography, morphologies, grammatical and syntactical rules, special patterns of text, etc. Ontologies 252 may include local and/or general ontologies 254, which may specify general language and enterprise-internal linguistic entities, and domain-specific ontologies 256, which specify linguistic entities of highly-specialized domains of discourse, e.g., those having idiosyncratic vocabularies and/or morphologies, such as in the fields of healthcare, law, finance, scientific research, etc. The present invention is not limited to a specific technique in which ontologies 252 are realized in an information integration infrastructure 20. Upon review of this disclosure, those having skill in computational linguistics will recognize different techniques by which ontologies 252 may be realized in particular information integration applications without departing from the spirit and intended scope of the present invention.

In FIG. 2, document collections 15 represent potentially large volumes of unstructured or semi-structured textual data from which information is to be extracted. To that end, a document collection 15 may be provided to a content analysis processor (CAP) 200, which generates informative metadata from the unstructured and semi-structured information contained in document collection 15 in accordance with information model 250. CAP 200 may also produce indices 244 with which the metadata extracted from document collection 15 are referenced, as well as entries in databases 246 and/or knowledge bases 248. Indices 244, databases 246 and knowledge bases 248 may be stored in database system 240 and made available to various applications executing on enterprise infrastructure 10. Database system 240 may be implemented by any conventional or other database or storage unit, may be local to or remote from server systems 12 and client systems 14, and may communicate via any appropriate communication mechanism, e.g., local area network (LAN), wide area network (WAN), Internet, hardwire, wireless link, Intranet, etc.

CAP 200 may include several functional components to perform various concomitant processes by which information is extracted from document collection 15. For example, CAP 200 may include one or more analysis engines 210 in which one or more respective annotators 215 execute. Exemplary analysis engines 210 are processor-executable agents that analyze documents in view of information model 250 to infer and record descriptive attributes about the documents as a whole and/or about regions or document sections therein. The descriptive information generated by analysis engines 210 may take the form of the aforementioned informative metadata about the document content and may be stored in one or more analysis output structures (AOSs) 220. Exemplary AOS 220 is a data structure by which objects, properties and values are represented in a format that is common across object types, e.g., text documents, audio files, video files, etc. In certain textual data integration implementations, each AOS 220 contains a copy of the text document that is analyzed, the metadata produced by analysis engines 210 about that document and other information as specified by a particular implementation of III 20. AOSs 220 may be provided to AOS processors 225, which generate end-use specific data, such as indices 244, databases 246 and knowledge bases 248, from the metadata and other information contained in AOSs 220.

The core analysis processing in an analysis engine 220 is performed by an annotator 215; the analysis engine 210 provides application programming interfaces (APIs) and infrastructure support for annotator 215. Exemplary annotators 215 are processor-executable agents that produce and record annotations over regions of a document or other object in accordance with information model 250. An "annotation," as used herein, is an association of informative metadata with a region of text in the document. Such associations are intended to convey meaning and, to that end, annotators 215 may perform such tasks as, for example, detecting source language and character encoding of the document content, tokenizing the text into words, identifying the parts of speech of different words, finding meaningful word phrases, e.g., noun phrases or adjective-noun pairs, automatically extracting named entities from the text, such as people, locations, and organizations, categorizing and classifying the content items, finding typical and custom patterns in the text through general purpose and customer-defined regular expressions, and searching for relevant general and custom-defined dictionary terms. It is to be understood that annotators 215 need not be implemented in compiled software code and, accordingly, may be executed by direct operations on statements (e.g., parsing, interpreting, etc.) that have been generated by one or more other processor-executable operations and supported by mechanisms of analysis engine 210.

CAP 200 may be realized in a variety of ways, including by one of many currently available open-source and commercial content analytics platforms. For example, CAP 200 may be based on the Unstructured Information Management Architecture (UIMA) standardized by the Organization for the Advancement of Structured Information Standards (OASIS). Upon review of this disclosure, skilled artisans will recognize various content analytic implementations in which the present invention can be embodied without departing from the spirit or intended scope thereof.

Figure 4:
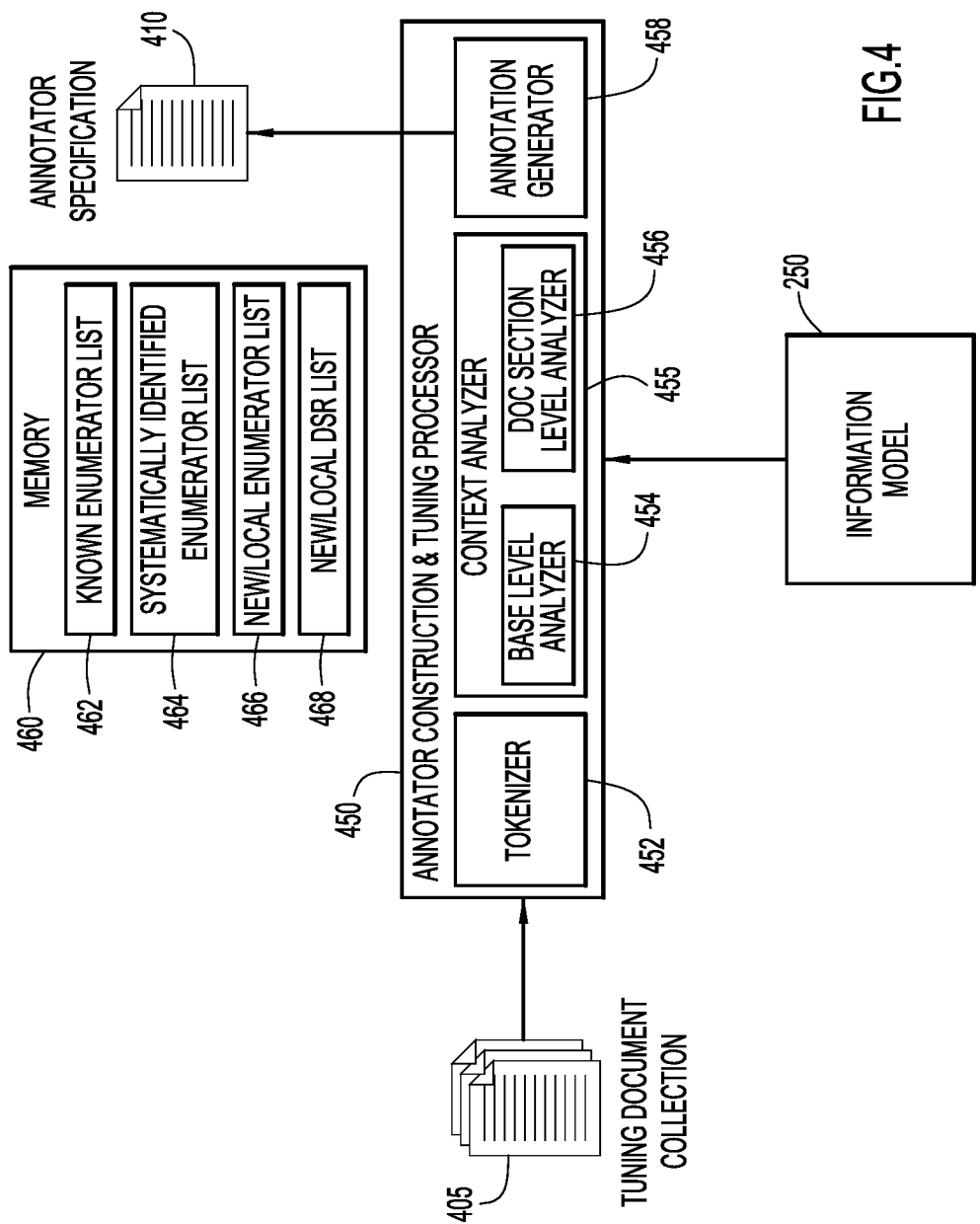
FIG. 4 is a schematic block diagram of an annotator construction and tuning processor in which the present general inventive concept can be embodied.

Embodiments of the present invention implement functional components and concomitant processes by which an annotator 215 is constructed or otherwise configured from a tuning document collection, illustrated as tuning document collection 405 in FIG. 4, in accordance with ontologies 252, particularly domain-specific ontologies 256.

Figure 3:
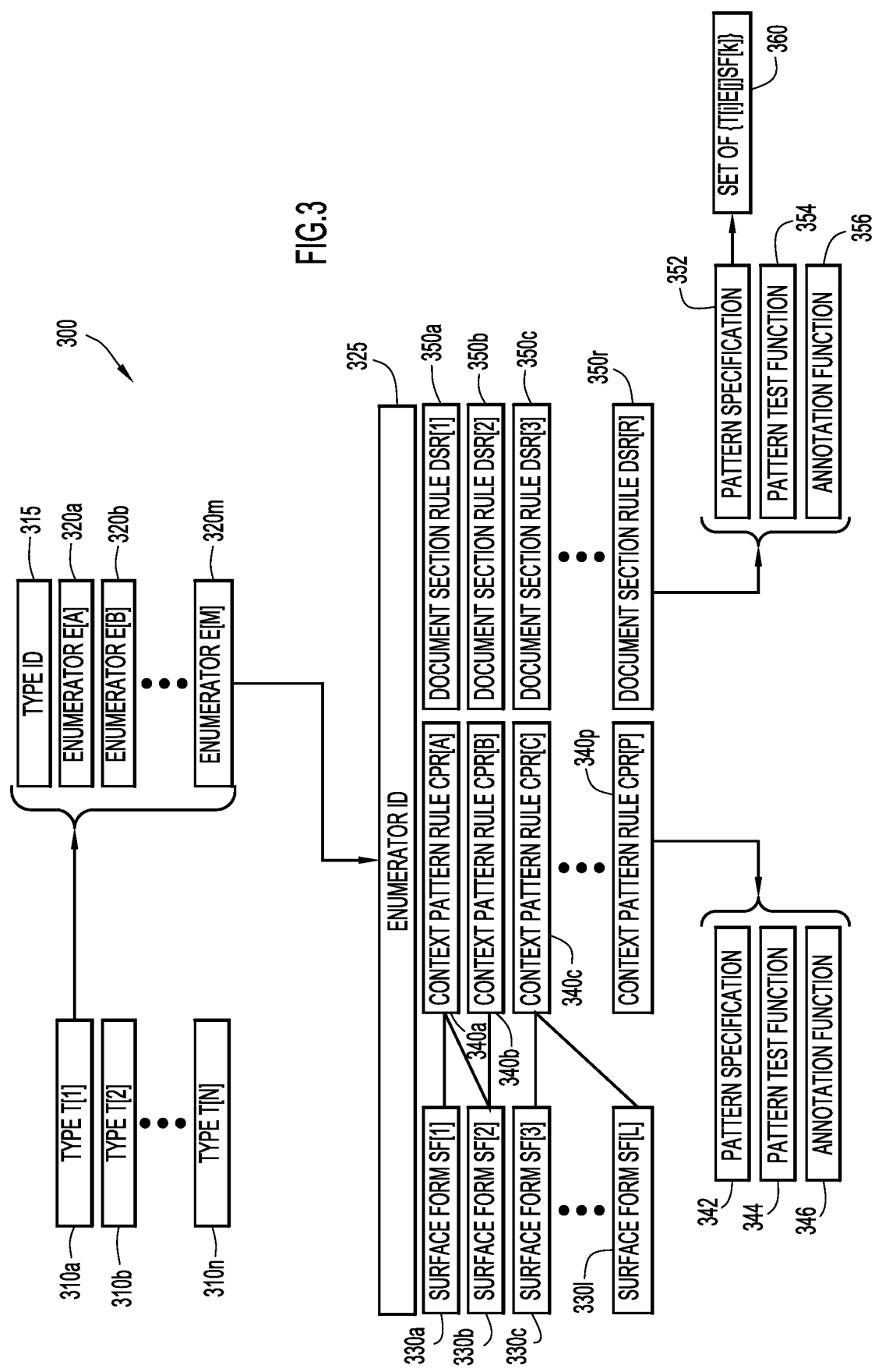
FIG. 3 is a data abstraction diagram of an information model type system in accordance with which embodiments of the present general inventive concept perform information extraction.

As illustrated in FIG. 2, information model 250 may include an enumerated type system 300 that establishes the semantic types by which information extracted from text is categorized. FIG. 3 is a data abstraction diagram of an exemplary type system 300 that may be implemented in embodiments of the present invention. Type system 300 defines all possible feature structures, terms and attributes that can be found in a document. Exemplary type system 300 implements enumerated types similar to enumerated types in certain programming languages. As such, type system 300 comprises a closed set of uniquely identifiable types 310a-310n, representatively referred to herein as type(s) 310, that encompasses a closed set of information categories of a specified domain of discourse. Each type 310 is distinguished from other types 310 and referenced by a unique, immutable type identifier 315, representatively referred to herein by the symbol T[i]. As an example, information in the domain "Healthcare" may be separated into such types T[i] as "Diagnosis," "Treatment," "Disease," etc.

Each type 310 encompasses a set of constituent enumerators 320a-320m, representatively referred to herein as enumerator(s) 320. In certain embodiments, enumerators 320 are also an enumerated type and comprise a closed set of all of the information sub-categories of the information categories encompassed by types 310. Each enumerator 320 may be distinguished by an immutable enumerator identifier 325, representatively referred to herein by the symbol E[j]. As an example, the type "Disease" may contain enumerators 320 with identifiers E[j] such as "gastroesophageal reflux disease," "malaria," "Alzheimer's disease," etc. Additionally, certain identifiers E[j] may be in the form alphanumeric codes, such as those of one or more healthcare coding systems and/or standards, e.g., the International Statistical Classification of Diseases and Related Health Problems (ICD) ICD-9 and/or ICD-10 code sets, Hierarchical Condition Codes (HCC) of the Centers for Medicare and Medicaid Services (CMS), etc. In certain embodiments, the identifier 325 of an enumerator 320 is a canonical, lemma or citation form of the word or code the enumerator 320 represents. The symbol T[i]E[j] will be used herein to refer to a particular enumerator 320 of a particular type 310.

In embodiments of the present invention, each enumerator 320 may contain one or more surface forms (SFs) 330a-330l, representatively referred to herein surface form(s) 330. As used herein, a "surface form" is the form in which the word or code represented by enumerator 320 appears in the text. For example, surface forms of the word "tibia," one of the bones in the lower leg, include the plural forms "tibias" and "tibiae." Each surface form 330 may be identified by an identifier, which may be a text string representation of the surface form word itself. Reference to a particular surface form is denoted herein by the symbol SF[k] and the symbol T[i]E[j]SF[k] will be used herein to refer to a particular surface form 330 of a particular enumerator 320 of a particular type 310.

Each enumerator 330 may contain or reference one or more context pattern rules (CPRs) 340a-340p, representatively referred to herein as context pattern rule(s) (or CPR(s)) 340. As used herein, a context pattern rule 340 is a specification of how a particular pattern of text is to be annotated in a document under scrutiny. As illustrated in FIG. 3, each CPR 340 may define a pattern specification 342, which may be an n-gram, parsing rule, regular expression, simple and/or complex linguistic phrase structure with and without constraints, semantic structure, etc., and a pattern test function 344 that determines whether the context pattern defined in specification 342 is met by a segment of document text. CPR 340 may additionally include an annotation function 346 that specifies the manner in which the pattern-matching text segment is to be annotated in the document.

As illustrated in FIG. 3, each SF 330 may reference or be otherwise associated with one or more CPRs 340. Such association binds the context in which a surface form word or code is found in the text, as recognized through pattern specification 342 and pattern test function 344, with particular information that is to be extracted therefrom, i.e., by way of the corresponding annotation function 346.

Enumerator 320 may contain or reference one or more document section rules (DSRs) 350a-350r, representatively referred to herein as document section rule(s) (or DSR(s)) 350. DSRs 350 are themselves context pattern rules and, accordingly, may define a pattern specification 352, a pattern test function 354 and an annotation function 356 that have similar purposes as their respective CPR counterparts described above. However, the context specified by a DSR 350 is defined by a set of similar words and phrases that are grouped together and thus form a document section. As is illustrated in FIG. 3 at pattern 360, a DSR pattern specification 352 may contain references to types T[i], enumerators E[j] and surface forms SF[k] as well as to the ordering, negation, aggregation, etc. of such entities.

Type system 300 may be implemented by suitable constructs of a programming language so as to be utilized by a data processing machine. For example, type system 300 may be established through a hierarchy of objects or classes of an object-oriented programming language such as Java, C++, C#, etc. Those having skill in the computer programming arts will recognize numerous computer code paradigms and configurations by which type system 300 may be realized without departing from the spirit and intended scope of the present invention.

FIG. 4 is a schematic block diagram of an exemplary annotator construction and tuning processor (ACTP) 450 in which the present invention may be embodied. ACTP 450 may be implemented as a combination of processor/memory circuitry and executable code on III 20 to produce a set of annotator specifications 412 contained in, for example, an annotator specification file 410. As used herein, annotator specification file 410 represents any of a variety of mechanisms by which an annotator 215 is realized in CAP 200 to identify general and domain-specific linguistic entities, e.g., terms, phrases, contexts, etc. and to associate the identified entities with appropriate metadata. In one example, annotator specification file 410 may contain program code of a processor-executable annotator 215. Additionally or alternatively, annotator specification file 410 may contain information regarding usage cases and context pattern scenarios from which the aforementioned program code can be realized by a competent programmer. Upon review of this disclosure, those having skill in the natural language processing and/or information extraction arts will recognize numerous other forms of machine-generated output that can be used in various implementations of the present invention as of annotator specifications without departing from the spirit and intended scope thereof.

As illustrated in FIG. 4, ATCP 450 may be configured or otherwise constructed to operate in accordance with information model 250 and the ontologies 252 and enumerated type system 255 realized therein. In one embodiment, information model 250 may be represented in ATCP 450 through a computer-readable data structure containing terminology, e.g., words, phrases, numbers, alphanumeric codes, etc., of a corresponding domains of discourse and "information extraction rules," i.e., specifications of a textual input pattern and a corresponding rule that specifies at least a semantic type in enumerated type system 300 by which the information extracted from the input pattern is classified and/or represented. In certain embodiments, information extraction rules include CPRs 340 and DSRs 350 of enumerated type system 300.

In one embodiment, information model 250 may be represented through a source code file that may be included with other source code files from which an executable annotator 115 may be produced, e.g., by way of a compiler, an interpreter or other mechanisms known to those skilled in processor-executable procedures. Certain embodiments of the invention may adapt or "tune" such an information model source code file by way of an automated process that generates suitable program code statements for annotator specification file 410, for example, to implement annotations for additional context patterns, surface forms, etc.

Exemplary ACTP 450 includes a tokenizer 452 by which each document in document collection 405 is segmented into suitable tokens, such as words, alphanumeric codes, phrases, etc. The tokenized document may be provided to context analyzer 455 that identifies context patterns in the text tokens as specified in information model 250. Context analyzer 455 may include a base level analyzer 454 by which CPRs 340 are processed and a document section level analyzer 456 by which DSRs 350 are processed. Content analyzer 455 may generate several lists to track and identify information-bearing content in tuning document collection 405, which may be stored in a memory unit 460. As described below, such lists may include a known enumerator list 462, a systematically-identified enumerator list 464, a new/local enumerator list 466 and a new/local document section rule list 468.

Annotation generator 458 may generate annotator specifications 212 in annotator specification file 410 based on the results produced by context analyzer 455. In one embodiment, annotation generator 458 generates the aforementioned program code from which a processor-executable annotator 215 is produced. In another embodiment, annotation generator 458 produces information regarding usage cases and context pattern scenarios from which annotator code can be realized by a competent programmer.

By way of embodiments of the present invention, organizations operating within the same domains of discourse can obtain organization-specific information without relying solely on annotator tuning services of an NLP expert. For example, information model 250 or elements thereof may be enterprise-neutral, i.e., sufficiently generic to the information requirements of more than one organization. Document collection 405, however, may be a set of documents used by a particular enterprise or organization and may contain the domain-specific terminology in organization-specific contexts. Accordingly, the same information model 250 can be used across organizations to produce annotators 215 that extract information relevant to a particular organization from organization-specific documents.

Figure 5A:
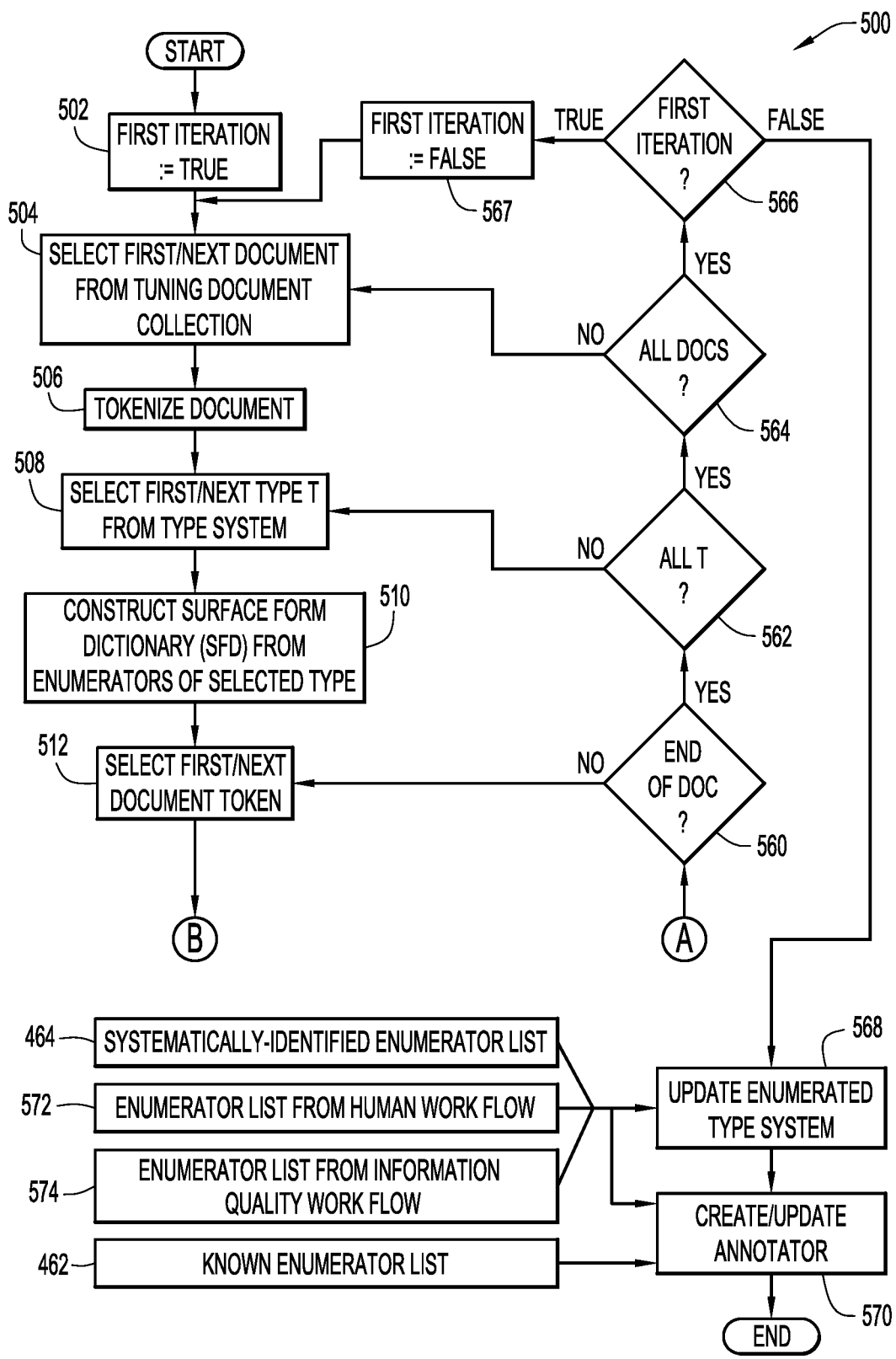
FIGS. 5A-5C are respective sections of a flow diagram of a text annotator construction and tuning process by which the present general inventive concept can be embodied.
Figure 5B:
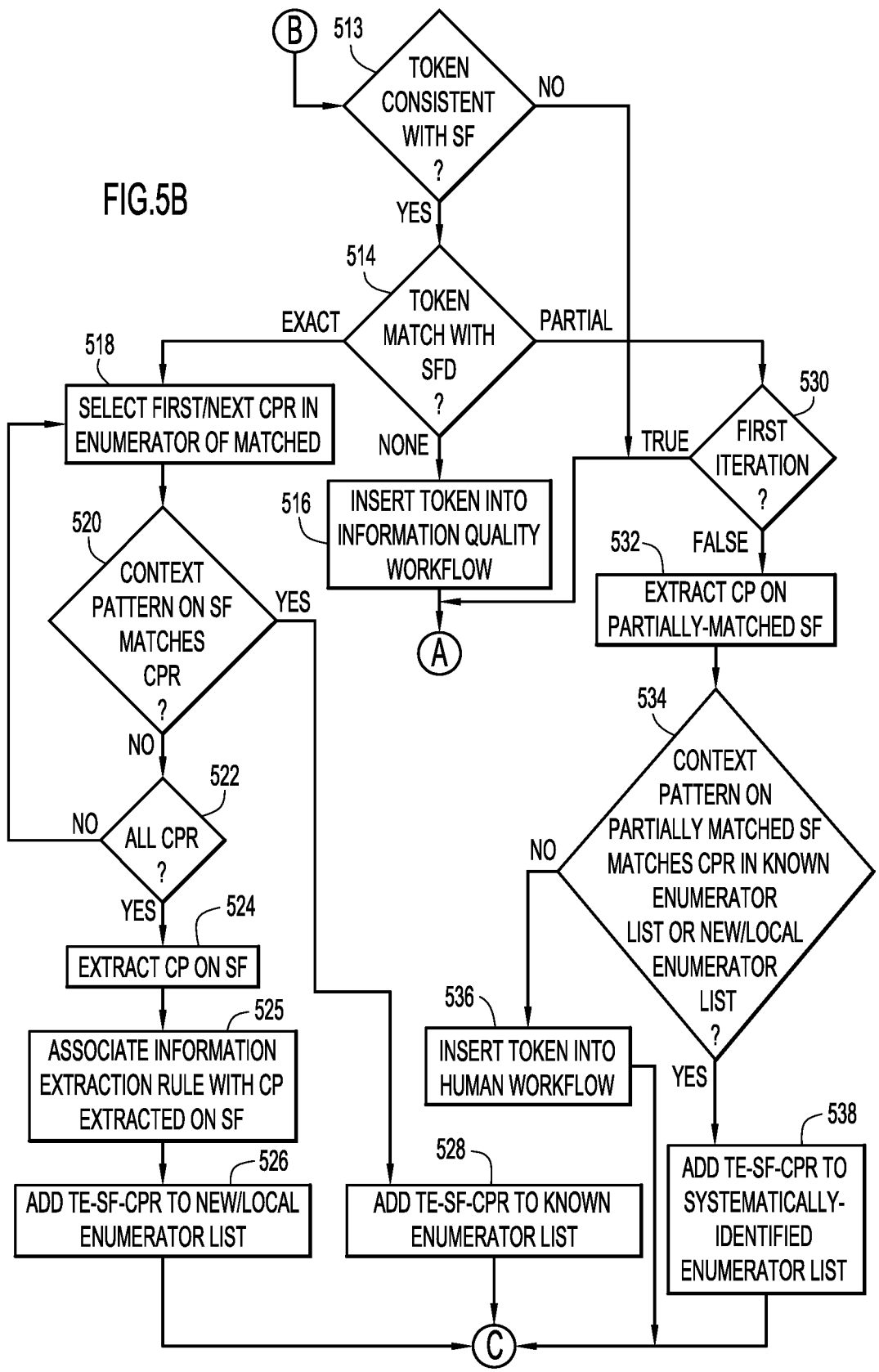
Figure 5C:
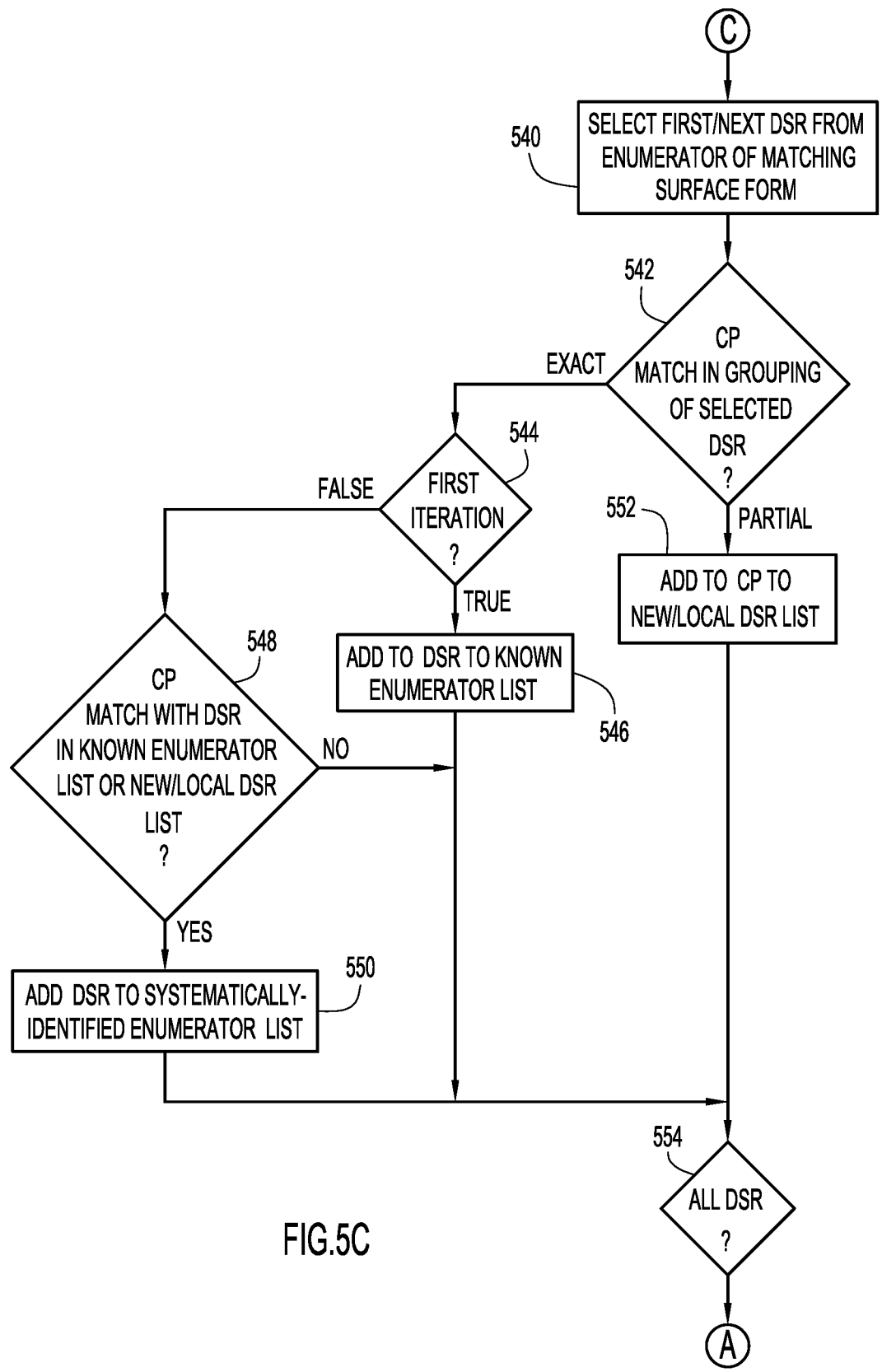

Exemplary operation of ACTP 450 is described with reference to the flow diagram illustrated in FIGS. 5A-5C, collectively referred to herein as FIG. 5, depicting a text annotator construction and tuning process 500 by which the present invention can be embodied. In certain embodiments, process 500 is performed iteratively; the first iteration through process 500 distinguishes known enumerators 320 from new enumerators 320, if any, contained in tuning document collection 405. Subsequent iterations of text annotator construction and tuning process 500 incorporate the differences, where applicable, into information model 250, particularly into enumerated type system 300 and/or into a new/updated annotator specification file 410. Accordingly, in operation 502, a first iteration flag is set, i.e., assigned the value of TRUE, to distinguish iterative stages of process 500. It is to be understood, however, that the present invention is not limited to any particular functional flow; numerous paradigms including non-iterative, state machine, parallel processing, etc. can be implemented to embody the present invention without departing from the spirit and intended scope thereof.

In operation 504, a first document is selected from tuning document collection 405 and, in operation 506, the selected document is tokenized into relevant linguistic entities, such as by any of numerous textual data tokenization techniques known to those skilled in computational linguistics. In operation 508, a first type 310 is selected from the type system 300 of information model 250. In operation 510, a surface form dictionary (SFD) is generated from the enumerators 320 of the selected type 310. As used herein, an SFD is a data structure in which enumerators 320 of a given type 310 are stored for purposes of constructing and tuning an annotator 215. An SFD may be constructed as a set union of surface forms across enumerators 320. In one embodiment, the SFD is indexed or otherwise organized by surface form 330 with which the corresponding enumerator 320 can be ascertained and accessed.

In operation 512, a document token is selected from the selected document for inspection against the SFD and, in operation 513 illustrated in FIG. 5B, it is determined whether the document token is identified as or is otherwise consistent with a surface form according to information model 250. If not, process 500 may transition back to operation 560 in FIG. 5A by which it is determined whether the end of the selected document has been reached. If not, the document inspection continues in operation 512. If the end of document has been reached, process 500 may transition to operation 562 by which it is determined whether all types in the information model 250 have been processed. If not, the next type in enumerated type system 300 is selected in operation 508. If all types have been processed, as determined by operation 562, it is determined in operation 564 whether all documents in tuning document collection 405 have been processed. If not, the next document is selected in operation 504 and process 500 repeats from that point. If all documents have been processed, the state of the first iteration flag is evaluated in operation 566. If the first iteration flag is not FALSE, it is set to FALSE in operation 567 and process 500 proceeds to a second iteration beginning at operation 504. If the first iteration flag is FALSE, signifying the end of the second iteration, process 500 transitions to operation 568 by which the enumerated type system 300 is updated, as will be described further below.

If it is determined in operation 513 in FIG. 5B that the selected document token is a surface form, it is determined in operation 514 whether a match exists between a surface form in the document token and a surface form in the SFD. If there is no match between the document token and the SFD, the selected document token is inserted into an information quality workflow, by which the document token is inspected through computer- and/or human-implemented information integration quality assurance techniques to determine why the token document was set apart from other textual data in a manner consistent with a surface form, such as, for example, through an error in tokenizer 452. Process 500 may then return to operation 560 in FIG. 5A and process 500 continues from that point as described above.

If the surface form in the document token exactly matches an entry in the SFD, as determined in operation 514, process 500 may transition to operation 518 by which the first CPR 340 in the enumerator 320 containing the exactly matching surface form is selected for evaluation. In operation 520, it is determined whether the context pattern in which the matching surface form appears in the text document matches the selected CPR 340. If so, process 500 transitions to operation 528 by which the exactly-matching SF 330 and the associated CPR 340 are added to known enumerator list 462. In certain embodiments, operation 528 is omitted and known enumerations are retrieved from known ontologies 252 and/or a prior annotation specification file 410. If, in operation 520, it is determined that the context pattern on the matching surface form does not match the selected CPR 340, it is determined in operation 522 whether all CPRs 340 in the enumerator 320 containing the exactly-matching SF 330 have been evaluated. If not, process 500 transitions back to operation 518, by which the next CPR 340 is selected. If, however, all CPRs 340 have been evaluated, process 500 transitions to operation 524, by which a context pattern in which the exactly-matching SF 330 appears in the selected document is extracted, such as by any of numerous textual context-extracting techniques known to those skilled in computational linguistics. In operation 525, an information extraction rule consistent with the extracted context pattern is associated therewith to create a CPR for the extracted surface form. In operation 526, the exactly-matching surface form and the created CPR are added as a TE-SF-CPR in new/local enumerator list 466.

If, in operation 514, it is determined whether a partial match exists between the document token and the SFD, tuning process 500 may transition to operation 530 by which the iteration flag is evaluated. If process 500 is undergoing the first iteration, i.e., first iteration flag evaluating to the TRUE state, process 500 may transition to operation 560 in FIG. 5A and continue from that point, as described above. If first iteration flag evaluates to the FALSE state as determined by operation 530, tuning process 500 may transition to operation 532, by which a context pattern is extracted from text in the document that contains the partially-matching surface form. In certain embodiments, ACTP 450 may be configured with or may otherwise have access to one or more libraries (not illustrated) of context patterns and associated information extraction rules. ACTP 350 may search through the entries in the libraries for a match with the text under analysis. In operation 534, it is determined whether the extracted context pattern matches a context pattern contained in a CPR 340 in known enumerator list or the new/local enumerator list 466. If so, the CPR 340 matching the extracted context pattern is used to form a TE-SF-CPR combination with the partially-matched surface form, which, in operation 538, is stored in a systematically-identified enumerator list 464 and, consequently, need not be processed by an NLP expert. If no match is found in operation 534, process 500 transitions to operation 536 by which the document token containing the partially-matching surface form is inserted into a human workflow for analysis by an NLP expert.

As illustrated in FIG. 5B, subsequent to either of operations 526, 528, 536 or 538, tuning process 500 transitions to operation 540 illustrated in FIG. 5C by which a first DSR 350 contained in enumerator 320 of the matching SF 330 is selected. In operation 542 it is determined whether the extracted context pattern on the matching surface form is contained in a grouping of the selected DSR 350. If the context pattern is exactly matched in a DSR grouping, process 500 may transition to operation 544, by which the first iteration flag is evaluated. If the first iteration flag evaluates to the TRUE state, the exactly-matching context pattern is already represented in a known DSR 350 and, as such, the matching DSR 350 is stored in known enumerator list 462 in operation 546. Process 500 may then transition to operation 554, by which it is determined whether all DSRs 350 have been evaluated (a surface form and context pattern may be associated with more than one document section). If so, process 500 may transition to operation 560 in FIG. 5A and may continue from that point as described above. If additional DSRs 350 need to be evaluated, process 500 may transition back to operation 540 and continue from that point.

If the first iteration flag evaluates to the FALSE state, as determined in operation 544, process 500 may transition to operation 548 by which it is determined whether the extracted context pattern matches an entry in a new/local DSR list 468, which is created as described below. If so, operation 500 transitions to operation 550 by which the matching DSR is added to DSRs 350 in systematically-identified enumerator list 464. Process 500 may then transition to operation 554 and continue from that point as described above.

If the extracted context pattern does not match an entry in the new/local DSR list 468, as determined in operation 548, process 500 may transition to operation 554 and may continue from that point as described above.

In the case of a partial match between the context pattern and the grouping in the selected DSR 350, as determined in operation 542, process 500 may transition to operation 552, by which the context pattern grouping is added to a new/local DSR list, which is used in the evaluation of operation 548. Process 500 may transition to operation 554 and continue from that point, as described above.

In operation 568 in FIG. 5A, enumerated type system 300 may be updated using systematically-identified enumerator list 464, from an enumerator list 572 from the aforementioned human workflow and an enumerator list 574 from the aforementioned information quality workflow. In operation 570, lists 464, 572, 574 and known enumerator list 464, together being representative of the updated type system 300, may be used to create or update annotators 215, such as through annotation specification file 410. Tuning process 500 may then terminate.

It will be appreciated that the embodiments described above and illustrated in the drawings represent only a few of the many ways of implementing embodiments for constructing and tuning text analytic annotators.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software (e.g., CAP 100, ACTP 250, annotator construction and tuning process 400) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., CAP 100, ACTP 250, annotator construction and tuning process 400) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g.,). The database system may be implemented by any number of any conventional or other databases, data stores or storage structures (e.g., files, databases, data structures, data or other repositories, etc.) to store information (e.g.,). The database system may be included within or coupled to the server and/or client systems. The database systems and/or storage structures may be remote from or local to the computer or other processing systems, and may store any desired data (e.g., document collections 15 and 205, ontologies 130 and 142, indices 144, databases 146, knowledge bases 148, annotator specification 210, domain model specification 225, etc.).

The present invention embodiments may employ any number of any type of user interface (e.g., Graphical User Interface (GUI), command-line, prompt, etc.) for obtaining or providing information (e.g., document collections 15 and 205, ontologies 130 and 142, annotator specification 210, domain model specification 225, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

Reports (e.g., query results, indices 144, annotator specifications 210, etc.) may include any information arranged in any fashion, and may be configurable based on rules or other criteria to provide desired information to a user (e.g., text analytics, profile scores, demographic information pertaining to the document author, etc.).

The present invention embodiments are not limited to the specific tasks or algorithms described above, but may be utilized for extraction of information from other data forms (images, audio/video files, etc.) and other natural language processing applications outside queries, databases, knowledge bases, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of tuning one or more text analytic annotators comprising:
    generating, via a processor, a data structure including domain information and one or more information extraction rules, wherein the domain information includes one or more enumerators for one or more data types of the domain, one or more text forms of the enumerators representing forms of the enumerators appearing in text, and one or more context patterns for the text forms, wherein the one or more extraction rules are associated with the enumerators, and wherein the domain information is generic with respect to requirements of more than one organization;
    tuning, via the processor, the one or more extraction rules to a specified set of documents with specialized information including domain specific terminology of a specific organization, wherein the tuning includes:
        identifying one or more additional context patterns and text forms within the set of documents for the enumerators of the data structure in a first iteration through the set of documents based on exact matches between tokens within the set of documents and the one or more text forms;
        identifying one or more additional context patterns and text forms within the set of documents for the enumerators of the data structure in a second iteration through the set of documents based on partial matches between tokens within the set of documents and the one or more text forms;
        updating the data structure with the additional context patterns and text forms from the first and second iterations; and
        analyzing the set of documents based on the updated data structure and generating one or more additional extraction rules based on the analysis;
    configuring, via the processor, one or more text analytic annotators for the specialized information based at least on the additional extraction rules; and
    processing documents with the specialized information via the configured text analytic annotators.

2. The computer-implemented method of claim 1, wherein identifying one or more additional context patterns in the first iteration includes:
    identifying within the set of documents one or more enumerators matching the enumerators of the data structure; and
    determining one or more context patterns of one or more text forms of the identified enumerators in the set of documents that are absent from the data structure and updating the data structure with the determined context patterns.

3. The computer-implemented method of claim 2, wherein identifying one or more additional text forms in the second iteration includes:
    identifying within the set of documents one or more enumerators partially matching the enumerators of the data structure;
    extracting one or more context patterns of one or more text forms of the identified partially matching enumerators in the set of documents and comparing the extracted context patterns to the context patterns of the updated data structure; and
    adding a text form of an identified partially matching enumerator to the updated data structure in response to a corresponding extracted context pattern matching a context pattern of the updated data structure.

4. The computer-implemented method of claim 1, wherein the tuning includes:
    identifying within the set of documents one or more enumerators partially matching the enumerators of the data structure; and
    updating the data structure with one or more extraction rules specific to the identified partially matching enumerators.

5. The computer-implemented method of claim 1, wherein generating the data structure includes:
    generating the data structure from a closed set of the one or more data types that encompasses a closed set of information categories of a specified domain of discourse.

6. The computer-implemented method of claim 5, wherein generating the data structure from the closed set of data types includes:
    generating the data structure from a closed set of the one or more enumerators for each of the closed set of data types that encompasses a closed set of information sub-categories of the information categories of the specified domain of discourse.

7. A system for tuning one or more text analytic annotators comprising:
    a computer system including at least one processor configured to:
        generate a data structure including domain information and one or more information extraction rules, wherein the domain information includes one or more enumerators for one or more data types of the domain, one or more text forms of the enumerators representing forms of the enumerators appearing in text, and one or more context patterns for the text forms, wherein the one or more extraction rules are associated with the enumerators, and wherein the domain information is generic with respect to requirements of more than one organization;
        execute an annotator construction and tuning module that tunes the one or more extraction rules to a specified set of documents with specialized information including domain specific terminology of a specific organization, the annotator construction and tuning module configured to:
            identify one or more additional context patterns and text forms within the set of documents for the enumerators of the data structure in a first iteration through the set of documents based on exact matches between tokens within the set of documents and the one or more text forms;
            identify one or more additional context patterns and text forms within the set of documents for the enumerators of the data structure in a second iteration through the set of documents based on partial matches between tokens within the set of documents and the one or more text forms;
            update the data structure with the additional context patterns and text forms from the first and second iterations; and
            analyze the set of documents based on the updated data structure and generate one or more additional extraction rules based on the analysis;
        configure one or more text analytic annotators for the specialized information based at least on the additional extraction rules; and
        process documents with the specialized information via the configured text analytic annotators.

8. The system of claim 7, wherein the annotator construction and tuning module, to identify one or more additional context patterns in the first iteration, is configured to:
- identify within the set of documents one or more enumerators matching the enumerators of the data structure; and
- determine one or more context patterns of one or more text forms of the identified enumerators in the set of documents that are absent from the data structure and update the data structure with the determined context patterns.

9. The system of claim 8, wherein the annotator construction and tuning module, to identify one or more additional text forms in the second iteration, is configured to:
- identify within the set of documents one or more enumerators partially matching the enumerators of the data structure;
- extract one or more context patterns of one or more text forms of the identified partially matching enumerators in the set of documents and compare the extracted context patterns to the context patterns of the updated data structure; and
- add a text form of an identified partially matching enumerator to the updated data structure in response to a corresponding extracted context pattern matching a context pattern of the updated data structure.

10. The system of claim 7, wherein the annotator construction and tuning module is configured to:
- identify within the set of documents one or more enumerators partially matching the enumerators of the data structure; and
- update the data structure with one or more extraction rules specific to the identified partially matching enumerators.

11. The system of claim 7, wherein the at least one processor generates the data structure from a closed set of the one or more data types that encompasses a closed set of information categories of a specified domain of discourse.

12. The system of claim 11, wherein the at least one processor generates the data structure from a closed set of the one or more enumerators for each of the closed set of data types that encompasses a closed set of information sub-categories of the information categories of the specified domain of discourse.

13. A computer program product for tuning one or more text analytic annotators comprising:
- one or more non-transitory computer readable storage media collectively having computer readable program code embodied therewith, the computer readable program code comprising computer readable program code that, when executed by at least one processor, configures the at least one processor to:
  generate a data structure including domain information and one or more information extraction rules, wherein the domain information includes one or more enumerators for one or more data types of the domain, one or more text forms of the enumerators representing forms of the enumerators appearing in text, and one or more context patterns for the text forms, wherein the one or more extraction rules are associated with the enumerators, and wherein the domain information is generic with respect to requirements of more than one organization;
  execute an annotator construction and tuning module that tunes the one or more extraction rules to a specified set of documents with specialized information including domain specific terminology of a specific organization, the annotator construction and tuning module configured to:
  identify one or more additional context patterns and text forms within the set of documents for the enumerators of the data structure in a first iteration through the set of documents based on exact matches between tokens within the set of documents and the one or more text forms;
  identify one or more additional context patterns and text forms within the set of documents for the enumerators of the data structure in a second iteration through the set of documents based on partial matches between tokens within the set of documents and the one or more text forms;
  update the data structure with the additional context patterns and text forms from the first and second iterations; and
  analyze the set of documents based on the updated data structure and generate one or more additional extraction rules based on the analysis;
  configure one or more text analytic annotators for the specialized information based at least on the additional extraction rules; and
  process documents with the specialized information via the configured text analytic annotators.

14. The computer program product of claim 13, wherein the computer readable program code configured to execute the annotator construction and tuning module to identify one or more additional context patterns in the first iteration includes computer readable program code configured to:
- identify within the set of documents one or more enumerators matching the enumerators of the data structure; and
- determine one or more context patterns of one or more text forms of the identified enumerators in the set of documents that are absent from the data structure and update the data structure with the determined context patterns.

15. The computer program product of claim 14, wherein the computer readable program code configured to execute the annotator construction and tuning module to identify one or more additional text forms in the second iteration includes computer readable program code configured to:
- identify within the set of documents one or more enumerators partially matching the enumerators of the data structure;
- extract one or more context patterns of one or more text forms of the identified partially matching enumerators in the set of documents and compare the extracted context patterns to the context patterns of the updated data structure; and
- add a text form of an identified partially matching enumerator to the updated data structure in response to a corresponding extracted context pattern matching a context pattern of the updated data structure.

16. The computer program product of claim 13, wherein the computer readable program code configured to execute the annotator construction and tuning module includes computer readable program code configured to:
- identify within the set of documents one or more enumerators partially matching the enumerators of the data structure; and
- update the data structure with one or more extraction rules specific to the identified partially matching enumerators.

17. The computer program product of claim 13, wherein the computer readable program code that generates the data structure includes computer readable program code that generates the data structure from a closed set of the one or more data types that encompasses a closed set of information categories of a specified domain of discourse.

18. The computer program product of claim 17, wherein the computer readable program code that generates the data structure from the closed set of data types includes computer readable program code that generates the data structure from a closed set of the one or more enumerators for each of the closed set of data types that encompasses a closed set of information sub-categories of the information categories of the specified domain of discourse.

* * * * *